United States Patent
Cellier et al.

(10) Patent No.: US 12,007,284 B2
(45) Date of Patent: Jun. 11, 2024

(54) METHOD AND SYSTEM FOR DETERMINING DATA CHARACTERIZING AT LEAST ONE CHANGE IN THE TEMPERATURE OF A COMPONENT OF A MOTOR VEHICLE DURING A TIME INTERVAL

(71) Applicant: PSA AUTOMOBILES SA, Poissy (FR)

(72) Inventors: Ze Cellier, Gif sur Yvette (FR); Papa Medoune Ndiaye, Savigny le Temple (FR)

(73) Assignee: PSA AUTOMOBILES SA, Poissy (FR)

( * ) Notice: Subject to any disclaimer, the term of this patent is extended or adjusted under 35 U.S.C. 154(b) by 0 days.

(21) Appl. No.: 18/256,845

(22) PCT Filed: Dec. 2, 2021

(86) PCT No.: PCT/FR2021/052189
§ 371 (c)(1),
(2) Date: Jun. 9, 2023

(87) PCT Pub. No.: WO2022/152985
PCT Pub. Date: Jul. 21, 2022

(65) Prior Publication Data
US 2024/0027284 A1   Jan. 25, 2024

(30) Foreign Application Priority Data
Jan. 12, 2021 (FR) ........................................ 2100241

(51) Int. Cl.
*G01K 13/00* (2021.01)

(52) U.S. Cl.
CPC .................................. *G01K 13/00* (2013.01)

(58) Field of Classification Search
CPC ...................................................... G01K 13/00
See application file for complete search history.

(56) References Cited

FOREIGN PATENT DOCUMENTS

| | | | | |
|---|---|---|---|---|
| CN | 102654423 A | * | 9/2012 | ............ B60L 3/0061 |
| DE | 102005023276 A1 | * | 11/2006 | ............... G01K 7/42 |
| EP | 3296964 A1 | | 3/2018 | |
| FR | 2959031 A1 | | 10/2011 | |
| FR | 3010554 A1 | | 3/2015 | |
| WO | 1993004353 A1 | | 3/1993 | |
| WO | WO-2020001679 A1 | * | 1/2020 | ............... G01K 3/08 |

OTHER PUBLICATIONS

International Search Report to corresponding PCT/FR2021/052189 mailed on Mar. 10, 2022.
Written Opinion to corresponding PCT/FR2021/052189 mailed on Mar. 10, 2022.

* cited by examiner

*Primary Examiner* — Mirellys Jagan
(74) *Attorney, Agent, or Firm* — Sandberg Phoenix & von Gontard P.C.

(57) ABSTRACT

The invention relates to a method for determining data characterizing at least one change in the temperature of a motor vehicle component during a time interval, using a computer system, and to a system (100) using such a method.

10 Claims, 5 Drawing Sheets

| Temp. | | Driving | | Load | | Parking | |
|---|---|---|---|---|---|---|---|
| min | max | % | Duration | % | Duration | % | Duration |
| 5 | 9 | 0.19% | 10 | 0.00% | 0 | 7.93% | 4282 |
| 9 | 13 | 0.32% | 17 | 0.00% | 0 | 9.42% | 5087 |
| 13 | 17 | 0.57% | 31 | 0.00% | 0 | 9.38% | 5066 |
| 17 | 21 | 0.83% | 45 | 0.00% | 0 | 9.59% | 5182 |
| 21 | 25 | 1.19% | 64 | 0.00% | 0 | 9.73% | 5253 |
| 25 | 29 | 1.62% | 88 | 8.40% | 206 | 9.87% | 5334 |
| 29 | 33 | 2.17% | 118 | 10.16% | 249 | 10.06% | 5432 |
| 33 | 37 | 2.84% | 154 | 10.14% | 249 | 10.00% | 5400 |
| 37 | 41 | 3.66% | 198 | 9.74% | 239 | 10.29% | 5558 |
| 41 | 45 | 4.66% | 252 | 9.78% | 240 | 10.16% | 5491 |
| 45 | 49 | 5.60% | 303 | 10.00% | 245 | 1.88% | 1016 |
| 49 | 53 | 7.07% | 383 | 10.64% | 261 | 0.52% | 282 |
| 53 | 57 | 9.16% | 496 | 9.92% | 243 | 0.38% | 205 |
| 57 | 61 | 9.84% | 533 | 10.09% | 248 | 0.28% | 149 |
| 61 | 65 | 11.38% | 616 | 9.87% | 242 | 0.20% | 107 |
| 65 | 69 | 11.48% | 621 | 1.10% | 27 | 0.14% | 73 |
| 69 | 73 | 9.70% | 525 | 0.10% | 3 | 0.09% | 47 |
| 73 | 77 | 6.76% | 366 | 0.05% | 1 | 0.05% | 27 |
| 77 | 81 | 4.96% | 269 | 0.02% | 1 | 0.03% | 16 |
| 81 | 85 | 3.58% | 194 | 0.01% | 0 | 0.02% | 8 |
| 85 | 89 | 2.23% | 121 | 0.00% | 0 | 0.01% | 4 |
| 89 | 93 | 0.18% | 10 | 0.00% | 0 | 0.00% | 0 |

FIG. 4

METHOD AND SYSTEM FOR DETERMINING DATA CHARACTERIZING AT LEAST ONE CHANGE IN THE TEMPERATURE OF A COMPONENT OF A MOTOR VEHICLE DURING A TIME INTERVAL

CROSS-REFERENCE TO RELATED APPLICATIONS

This application is the US National Stage under 35 USC § 371 of International Application No. PCT/FR2021/052189, filed Dec. 2, 2021, which claims the priority of French application 2100241 filed on Jan. 12, 2021, the content (text, drawings and claims) of both said applications being incorporated by reference herein.

BACKGROUND

The systems and methods disclosed herein relate to the field of computer systems and computerized methods for assisting in the design of motor vehicle components, in particular systems and methods which make it possible to determine the safety of operation of the components of motor vehicles, taking into account in particular the consequences of temperature variations which affect the longevity of certain motor vehicle components. In particular, a method for determining data characterizing at least one change in the temperature of a motor vehicle component during a time interval using a computer system is disclosed. A computer system implementing such a method is also disclosed.

It is known that the service life of certain motor vehicle components is a very important matter. This is in particular the case for on-board computing and electronic devices that are currently present in most motor vehicles. For such components, the risk of failure is therefore very limited and it is consequently difficult to precisely determine the service life, that is the reliability, of these components. Indeed, reliability engineers or designers of components that have reliability requirements know that, when it is a matter of determining the reliability of components, it is necessary to be able to establish the risk of failure. However, for each component, the risk of failure cannot be established without knowing the mission profile of use of the component in question, that is the use that is made of the component over time. Thus, for motor vehicle components which undergo thermal stresses, the temperature profile, that is the change in temperature of the component over time, is essential to be able to reliably determine the risk of failure; from that risk of failure, factors relating to the longevity, that is the reliability, of the components can then be extrapolated. However, for a motor vehicle manufacturer, this involves obtaining knowledge of all temperature profiles of all the components for all vehicles. Indeed, each usage mission profile, and therefore each temperature profile, varies from one component to another, from one vehicle to another, depending on the location thereof, the driving conditions, the outside environment, etc. However, even if it is known today to equip motor vehicles with temperature sensors in order to measure the temperature of vehicle components during use and to transmit measurement data to remote computer systems to perform processing in order to extract therefrom statistics on the longevity of the components, such a solution remains unattainable for motor vehicle manufacturers insofar as it involves a significant increase in the cost of the vehicles because of the need to adapt means for measuring the temperature and of transmitting appropriate data for each component.

SUMMARY

The present disclosure aims to overcome these disadvantages. The object is to provide a method and a system that make it possible to determine the change in temperature of a component of a motor vehicle during a time interval. Furthermore, secondarily, an object is to provide a method and a system that contribute to making it possible to determine with greater precision the longevity, that is the reliability, of motor vehicle components, in particular those which are affected by variations in their temperature. By virtue of its means, the systems and methods therefore advantageously apply to the phases of research and development of motor vehicle components, by aiming to provide the designers of motor vehicle components with computer tools that facilitate the steps of checking the reliability of the vehicle components.

These aims are achieved, according to a first object, by means of a method for determining data characterizing at least one change in temperature of a component of a motor vehicle during a time interval, using a computer system, the method comprising the steps of:
  i) acquiring data characterizing at least one probability of performing at least one usage sequence of the vehicle;
  ii) acquiring data characterizing at least one duration or at least one distance and at least one stabilized temperature with regard to at least one segment of at least one usage sequence of the vehicle;
  iii) acquiring data characterizing at least one thermal inertia value with regard to at least one segment;
  iv) acquiring data characterizing at least one number of usage sequences;
  v) acquiring data characterizing at least one value representing the range of the vehicle;
  vi) determining data characterizing an estimate of a number of usage sequences used;
  vii) determining data characterizing a particular usage sequence of the vehicle according to the data characterizing at least one probability of performing at least one vehicle usage sequence;
  viii) determining data characterizing a duration for each of the segments of the particular usage sequence of the vehicle;
  ix) determining data characterizing a stabilized temperature value for each of the segments of the particular usage sequence of the vehicle;
  x) determining data characterizing a one-time value of the temperature of the component during a current segment of the particular usage sequence of the vehicle as a function of data characterizing the stabilized temperature during the segment of the particular usage sequence of the vehicle that precedes the current segment of the particular usage sequence of the vehicle, of data characterizing the difference between the stabilized temperature during the current segment of the particular usage sequence of the vehicle and the stabilized temperature during the segment of the particular usage sequence of the vehicle that precedes the current segment of the particular usage sequence of the vehicle, and of data characterizing the ratio between the duration elapsed since the start of the current segment of the particular usage sequence of the vehicle and the thermal inertia value for the current segment determined from the data characterizing at least one thermal inertia value with regard to at least one segment; and xi) determining the data characterizing at least one change in temperature of a motor vehicle component using the data characterizing at least one one-time value of the temperature of the component during a current segment of the particular usage sequence of the vehicle.

According to one variant, step vi) can comprise a step consisting in performing a random selection from the data characterizing at least one number of usage sequences.

According to another variant, step viii) can comprise a step consisting in performing a random selection from the data characterizing at least one duration with regard to at least one segment of at least one usage sequence of the vehicle.

According to another variant, step ix) can comprise a step consisting of performing a random selection from the data characterizing at least one stabilized temperature with regard to at least one segment of at least one usage sequence of the vehicle.

According to another variant, the method may further comprise a step consisting of determining data characterizing at least one value of the temperature of the component with regard to a value indicative of a proportion, of a duration and/or of a usage mode of the vehicle.

According to another variant, the method may further comprise the steps of:
using the data characterizing at least one temperature change of a motor vehicle component to determine, by Fourier transform, data characterizing frequencies and amplitudes corresponding to several usage sequences;
determining data characterizing a number of equivalent laboratory cycles according to the data characterizing frequencies and amplitudes corresponding to several usage sequences.

According to another variant, the data characterizing at least one probability of performing of at least one vehicle usage sequence are generated so as to form a Markov chain.

Furthermore, a system for determining data characterizing at least one change in temperature of a component of a motor vehicle during a time interval is also described, the system comprising at least one information processing unit, comprising at least one processor, and a data storage medium configured to implement a method as described above.

Furthermore, a program comprising program code instructions for the execution of the steps of a method is described as above when said program is executed on a computer and/or a processor.

Furthermore, a medium that can be used in a computer on which a program as described above is recorded is also described.

BRIEF DESCRIPTION OF THE FIGURES

Other features and advantages will become apparent from examining the detailed description hereinafter, and the appended drawings, in which:

FIG. 4 is a schematic illustration of data characterizing at least one value of the temperature of the component with regard to a value indicative of a proportion, of a duration and/or of a usage mode of the vehicle.

DETAILED DESCRIPTION

Figure 1:
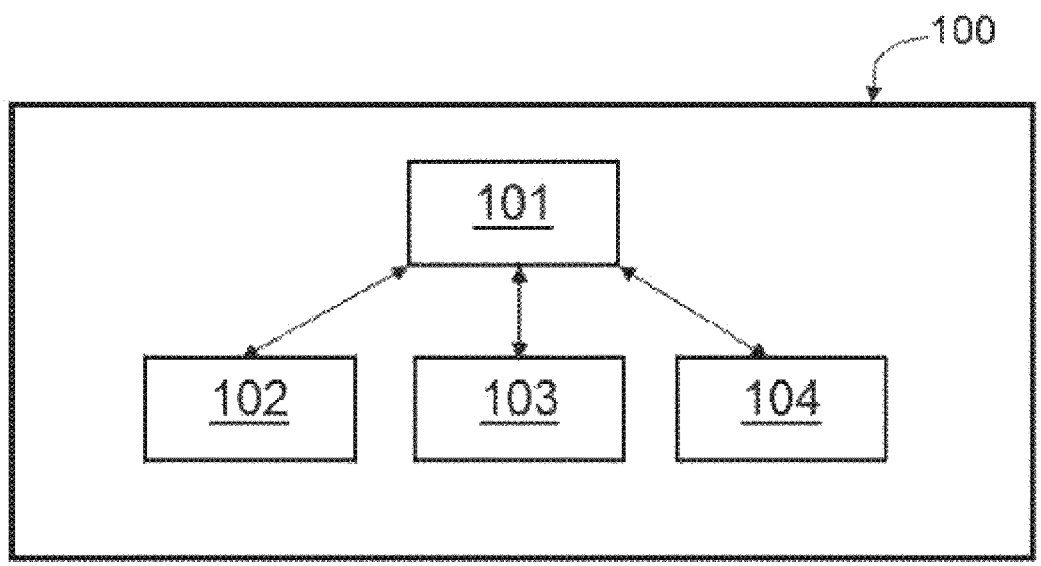
FIG. 1 is a functional diagram of a system.

A system 100 for determining data characterizing at least one change in temperature of a component of a motor vehicle during a time interval is a computer system, shown schematically in FIG. 1, which comprises an information processing unit 101, comprising one or more processors, a data storage medium 102, at least one input and output interface 103, allowing data reception and data transmission, and a graphical user interface 104. According to certain embodiments, the system 100 comprises one or more computers, one or more servers, one or more supercomputers and/or any combination comprising one of these computer systems. According to another embodiment, the system 100 is hosted on a server forming part of a cloud computing infrastructure.

Figure 2:
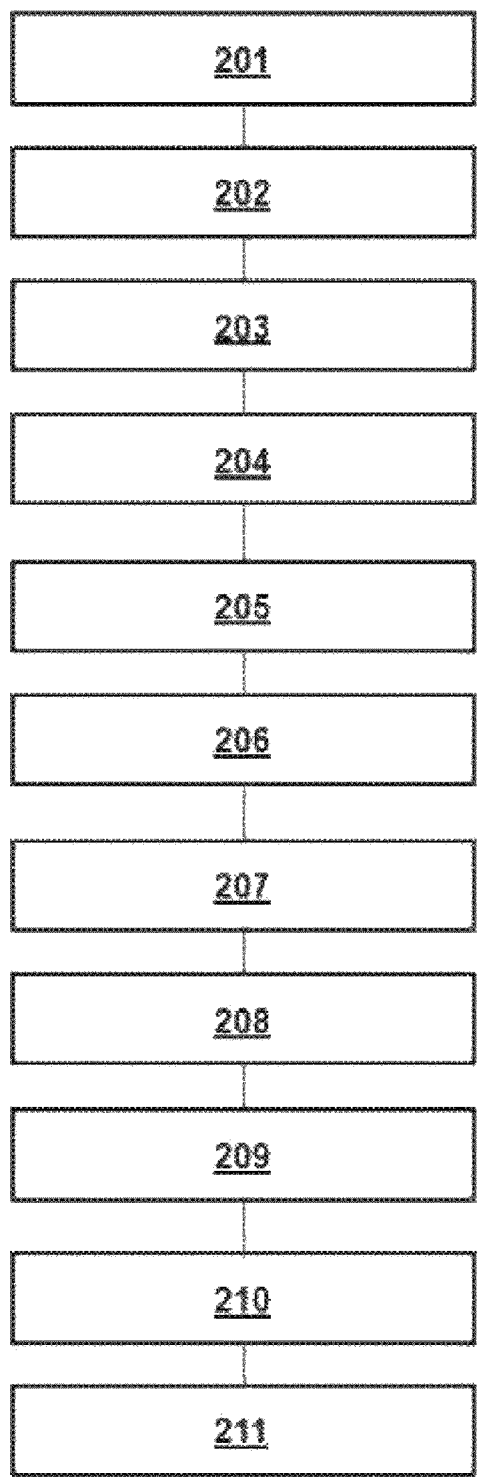
FIG. 2 is an organization chart showing the steps of a method.

All the elements described above contribute to enabling the system 100 to implement a method for determining data characterizing at least one change in temperature of a component of a motor vehicle during a time interval, as described below in connection with FIG. 2.

According to a first step 201 of the method, the system 100 acquires, for example by interacting with its data storage medium 102 and/or its input and output interface 103, data characterizing at least one probability of performing at least one vehicle usage sequence. Indeed, it is considered that the use of a motor vehicle during a pre-established time interval, chosen to correspond to an average duration of use (for example, 7 years), is broken down into a plurality of "usage sequences", each broken down into several "segments" each defining a specific type of use that is made of the vehicle during a time interval. Thus, a usage sequence therefore defines a sequence of several types of use of the vehicle which are carried out consecutively. For example, a usage sequence can define the succession of segments, that is of the following types of use: Sequence(i)=(Parking-city-traffic jam-road-city-parking). Thus, according to this example, a vehicle usage sequence stipulates that, according to the first segment of the usage sequence, the vehicle has first been used according to a first type of use "parking", then, according to the second segment of the usage sequence, the vehicle has been used according to a second type of use "city", then, according to the third segment, according to a third type of use "traffic", etc. Thus, during this first step 201 of the method, the system 100 endeavors to acquire data which will subsequently make it possible to determine a temperature profile of a component, in particular by breaking down the profile into a succession of usage sequences, themselves divided into several segments identifying distinct types of use that are made of the vehicle. In addition, the data acquired by the system 100 during this first step 201 of the method characterize not usage sequences, but rather characterize at least one probability of performing at least one usage sequence of the vehicle. In other words, the system 100 acquires during the first step 201 of the method data which only indirectly identifies usage sequences, thereby characterizing them by means of the probabilities of their being performed. In concrete terms, the data characterizing at least one probability of performing at least one vehicle usage sequence are for example generated so as to form a Markov chain, that is they are generated in such a way that the different segments which are likely to form a usage sequence, that is the different types of use which can be made of a vehicle (parking, city, traffic jam, traffic-city, highway, road, etc.), are identified by means of distinct random variables linked by probabilities. However, this deliberate choice as to the format of the data acquired by the system 100 during this first step 201 of the method will advantageously thereafter allow the system 100, as will be seen below, to randomly generate usage sequences of a vehicle. Furthermore, by placing the random usage sequences end-to-end, these data characterizing at least one probability of performing a vehicle usage sequence acquired by the system 100 during this first step 201 of the method will allow the system 100 to randomly generate a temperature profile of a motor vehicle component.

According to a second step 202 of the method, the system 100 acquires data characterizing at least one duration or at least one distance and at least one stabilized temperature with regard to at least one segment of at least one usage sequence of the vehicle. Indeed, it is considered that a segment, that is a type of use, is characterized by a duration and/or a distance and by a stabilized temperature (for example, average) of the component during the segment. For example, a "parking" segment of 2 h during which the stabilized temperature of a component is Tp. Furthermore, here as well, the data characterizing at least one duration or at least one distance and at least one stabilized temperature with regard to at least one segment of at least one usage sequence of the vehicle acquired by the system 100 during this second step 202 of the method are generated in a particular way. Indeed, each is preferentially identified by a specific probability density. Furthermore, here as well, this deliberate choice as to the format of these data will advantageously enable the system 100, as will be seen below, to further introduce probabilistic bias into the usage sequences which will be determined, in particular at the durations or distances traveled and temperatures stabilized during the segments, thus making it possible to randomly generate a temperature profile of a component of a vehicle which best reflects the reality of an actual use of a vehicle (that is of a component) by one or more human drivers.

According to a third step 203 of the method, the system 100 acquires data characterizing at least one thermal inertia value with regard to at least one segment. Indeed, the thermal inertia corresponds to the necessary duration, when the vehicle is used according to a particular segment, so that the temperature of the component reaches the stabilized temperature. The thermal inertia is therefore specific to each vehicle, in fact it depends on the vehicle architecture under the hood and the segment according to which the vehicle is being used. Thus, the data characterizing at least one thermal inertia value with regard to at least one segment are stored on the data storage medium 102, for example in a database, and they provide at least one thermal inertia value for each segment which is likely to form a vehicle usage sequence.

According to a fourth step 204 of the method, the system 100 acquires data characterizing at least one number of usage sequences. More specifically, during this step, the system 100 endeavors to acquire data characterizing statistics established with regard to a number of usage sequences that could be carried out by drivers of the vehicle in question. In other words, the system 100 acquires at this stage, by interacting preferentially with its data storage medium 102, data on at least one number of vehicle usages that could be carried out by at least one driver, preferably on several numbers of usage sequences of the vehicle, which could be carried out by several drivers. Thus, the system 100 acquires during this fourth step 204 of the method, data on the service life, that is the longevity, of the vehicle in question.

According to a fifth step 205 of the method, the system 100 acquires data characterizing at least one value representing the range of the vehicle. Thus, when the vehicle in question is an internal combustion engine vehicle, these data relate to, for example, the fuel consumption of the vehicle, by identifying, for example, different consumption levels with regard to different segments of usage sequences. Alternatively, or cumulatively, these data relate to an average distance which can be traveled with a full tank. Likewise, when the vehicle in question is an electric vehicle, the data acquired by the system 100 during this step can relate to the electrical consumption of the vehicle with regard to segments of particular usage sequences and/or on an average distance which can be traveled with a full battery charge of the vehicle in question. As will be seen below, these data, which are preferentially stored on the data storage medium 102, will for example allow the system 100, inter alia, to identify the component temperatures that correspond to charging phases of an electric vehicle.

According to a sixth step 206 of the method, the system 100 acquires data characterizing an estimate of a number of usage sequences performed. To do this, the system 100 performs a first random selection from the data characterizing at least one number of usage sequences. In other words, the system 100 uses the data which relates to statistics of numbers of usage sequences actually performed by drivers of the vehicle in question acquired during the fourth step 204 of the method in order to randomly determine a number of usage sequences which could probably be performed with the vehicle in question. By this step, the system 100 establishes specific probable longevity for the vehicle in question and, therefore, for the component.

According to a seventh step 207 of the method, the system 100 determines data characterizing a particular vehicle usage sequence as a function of the data characterizing at least one probability of performing at least one vehicle usage sequence. Indeed, after having identified specific probable longevity of the component, the system 100 must break this longevity down into a plurality of usage sequences of the vehicle and, to do this, it proceeds iteratively by successively identifying particular usage sequences, that is usage sequences formed of particular segments. Furthermore, in order to identify a particular usage sequence, the system 100 advantageously carries out a second random selection from the data characterizing at least one probability of performing at least one vehicle usage sequence acquired during the first step 201 of the method. Furthermore, when the data characterizing a probability of performing at least one vehicle usage sequence are advantageously generated so as to form a Markov chain, the system 100 is in this case able to randomly determine a plurality of particular usage sequences. Thus, at the end of this seventh step 207 of the method, the system 100 has determined at least one particular usage sequence such as, for example: Sequence_part= (Parking-city-city traffic jam-road-parking).

According to an eighth step 208 of the method, the system 100 determines data characterizing a duration for each of the segments of the particular usage sequence of the vehicle. Furthermore, here again, the system 100 does so by carrying out a third random selection from the data, characterizing at least one duration with regard to at least one segment of at least one usage sequence of the vehicle, that was acquired during the second step 202 of the method. Thus, at the end of this eighth step 208, the system 100 has modified the particular sequence determined in the preceding step of the method in such a way that: Sequence_part=(3 h/Parking-5 min/city-10 min/city traffic jam-20 min/road-1 h/parking).

Alternatively, or cumulatively, the system 100 similarly determines distances, by making the third random selection from the data characterizing at least a distance with regard to at least one segment of at least one usage sequence that was acquired during the second step 202 of the method. In this case, the particular sequence modified by the system 100 during this eighth step 208 of the method is such that: Sequence_part=(0 km/Parking-7.3 km/city-1 km/city traffic jam-17.8 km/road-0 km/parking).

According to a ninth step 209 of the method, the system 100 determines data characterizing a stabilized temperature value for each of the segments of the particular usage sequence of the vehicle. Furthermore, here again, the system 100 does so by carrying out a fourth random selection from the data, characterizing at least one stabilized temperature with regard to at least one segment of at least one usage sequence of the vehicle, that was acquired during the second step 202 of the method. Thus, at the end of this ninth step 209, the system 100 has modified the particular sequence determined in the preceding step of the method in such a way that: Sequence_part=(3 h/Parking/5° C./5 min/city/50° C.-10 min/city traffic jam/80° C.)-20 min/road/45° C.-1 h/parking/10° C.).

According to a tenth step 210 of the method, the system 100 determines data characterizing a one-time value of the temperature of the component during a current segment of the particular usage sequence of the vehicle as a function of data characterizing the stabilized temperature during the segment of the particular usage sequence of the vehicle that precedes the current segment of the particular usage sequence of the vehicle, of data characterizing the difference between the stabilized temperature during the current segment of the particular usage sequence of the vehicle and the stabilized temperature during the segment of the particular usage sequence of the vehicle that precedes the current segment of the particular usage sequence of the vehicle, and of data characterizing the ratio between the duration elapsed since the start of the current segment of the particular usage sequence of the vehicle and the thermal inertia value for the current segment determined from the data characterizing at least one thermal inertia value with regard to at least one segment. More specifically, during this step of the method, the system 100 determines a value of the point temperature of the component during a current segment of the particular usage sequence of the vehicle, T(t) according to the formula:

$$T(t) = T_0 + \Delta T * (1 - \exp(-\left(\frac{Du}{\text{Thermal\_inertia}}\right))$$

where $T_0$ is the stabilized temperature during the segment of the particular usage sequence of the vehicle that precedes the current segment of the particular usage sequence of the vehicle, $\Delta T$ is the difference between the stabilized temperature during the current segment of the particular usage sequence of the vehicle and the stabilized temperature during the segment of the particular usage sequence of the vehicle that precedes the current segment of the particular usage sequence of the vehicle, Du is the duration elapsed since the start of the current segment of the particular usage sequence of the vehicle, and Thermal_inertia is the thermal inertia value for the current segment. Thus, according to the example mentioned above, the system 100 determines during this tenth step 210 of the method the one-time values of the temperature of the component, for example during the segments "city" and "city traffic jam", such that:

T(1)=5+(50−5)*(1−exp(−1/thermal_inertia_city)

T(2)=5+(50−5)*(1−exp(−2/thermal_inertia_city)

. . .

T(5)=5+(50−5)*(1−exp(−5/thermal_inertia_city)

T(6)=50+(80−50))*(1−exp(−1/thermal_inertia_city_traffic jam)

T(7)=50+(80−50))*(1−exp(−2/thermal_inertia_city_traffic jam)

. . . .

Figure 3:
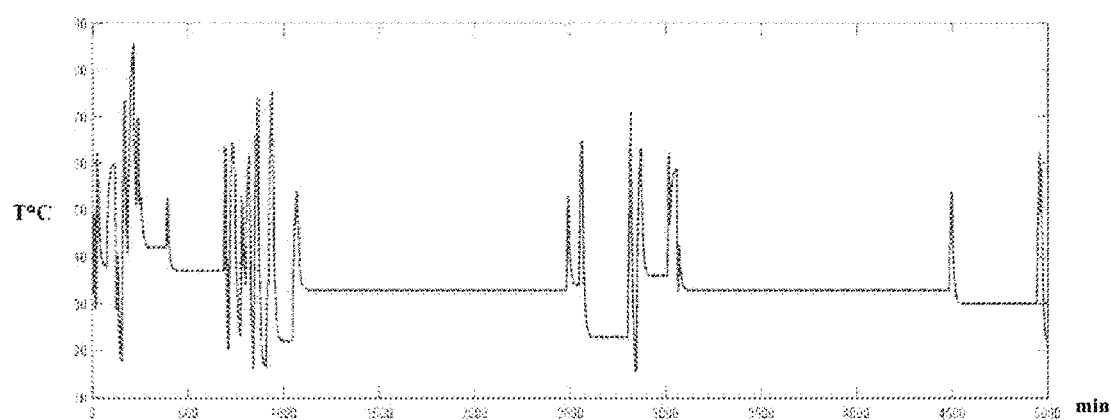
FIG. 3 is a graph showing data characterizing at least one change in the temperature of a component of a motor vehicle during a time interval.

According to an eleventh step 211 of the method, the system 100 determines the data characterizing at least one change in temperature of a motor vehicle component using the data characterizing at least one one-time value of the temperature of the component during a current segment of the particular usage sequence of the vehicle. To do this, the system iteratively reproduces the four previous steps 207-210 of the method until reaching the estimate of the number of usage sequences determined during the sixth step 206 of the method. Thus, at the end of this eleventh step 211 of the method, the system 100 therefore determines data which characterizes a change in temperature of the component during a time interval which are for example represented by the graph shown in FIG. 3.

Furthermore, according to a first particular embodiment, the system 100 performs another step during which it determines data characterizing at least one value of the temperature of the component with regard to a value indicative of a proportion, of a duration and/or of a usage mode of the vehicle.

To do so, the system 100 performs a first secondary step during which it iteratively reproduces the steps 206-211 of the method. In particular, the system 100 iteratively performs a random selection of a number of usage sequences, as a function of which it performs a plurality of random selections of particular usage sequences, a plurality of random selections of durations (or distances), a plurality of random stabilized temperatures, a plurality of calculations of one-time temperatures values of the component in order to determine a plurality of changes in the temperature of the component. Thus, at the end of this first secondary step, the system 100 determines a change in temperature of a component for a plurality of vehicles having different longevities.

Next, according to a second secondary step, the system 100 uses these different changes in the temperature of the component for vehicles with distinct longevities determined during the preceding step in order to determine, for example by calculating for each change in the averages with regard to durations and temperatures, then by means of averaging all the changes, the data characterizing at least one value of the temperature of the component with regard to a value indicative of a proportion, of a duration and/or of a mode of use (for example, driving, charging, parking) of the vehicle. Schematically, these data correspond, for example, to the table shown in FIG. 4.

Figure 5:
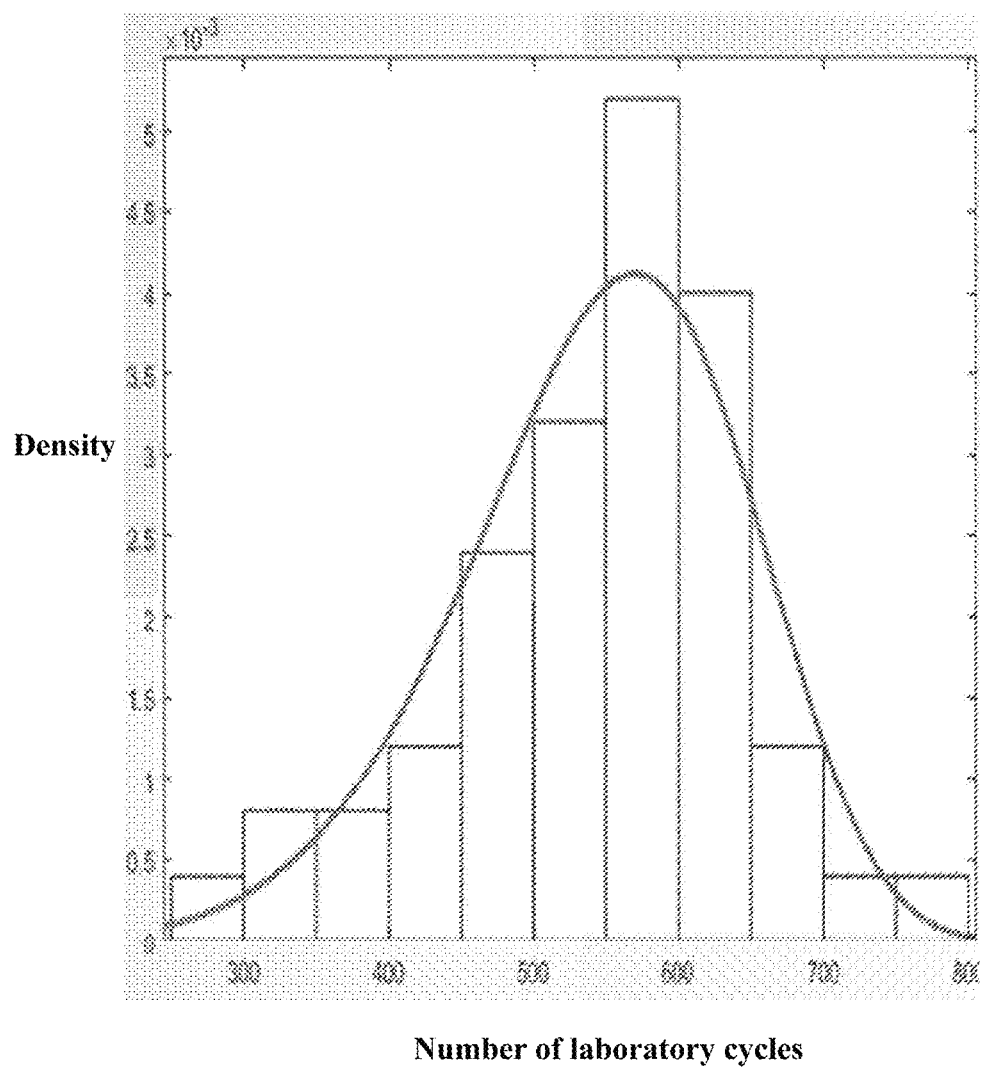
FIG. 5 is a graph showing data characterizing an equivalent number of laboratory cycles.

Furthermore, according to a second particular embodiment, the system performs a first secondary step during which it uses the data characterizing at least one temperature change of a motor vehicle component to determine, by Fourier transform, data characterizing frequencies and amplitudes corresponding to several usage sequences. Then, the system 100 performs a second secondary step during which it determines data characterizing an equivalent number of laboratory cycles as a function of the data characterizing the frequencies and the amplitudes corresponding to several usage sequences. To do this, the system 100 uses the frequencies and amplitudes with regard to damage laws, for example the Coffin-Manson and/or Norris-Landzberg law. By this step, the system 100 determines, for a change in temperature of the given component, an equivalent number of laboratory cycles. Furthermore, by proceeding iteratively as explained above, that is by determining a plurality of changes for several vehicles with distinct longevities, the system 100 determines a plurality of different numbers of laboratory cycles that can be shown by the chart presented in FIG. 5, which can then be deduced from the probability density that defines the longevity of a component.

Consequently, through the method and system described above, a solution is provided to determine the change in temperature of a component of a motor vehicle during a time interval. Thus, the method and the system contribute to making it possible to determine with greater precision the longevity, that is the reliability, of the components of motor vehicles, in particular those which are affected by variations in their temperature. By virtue of these means, the method and system therefore advantageously apply to the phases of research and development of motor vehicle components, by providing the designers of motor vehicle components with computer tools that facilitate the steps of checking the reliability of the vehicle components.

The invention claimed is:

1. A method for determining, by a computer system, data characterizing at least one change in temperature of a component of a motor vehicle during a time interval, wherein the method comprises the steps of:
   i) acquiring data characterizing a probability of performing a vehicle usage sequence, the usage sequence comprising multiple segments;
   ii) acquiring data characterizing a duration or a distance and a stabilized temperature with regard to at least one of the segments of the vehicle usage sequence;
   iii) acquiring data characterizing a thermal inertia value with regard to the at least one of the segments;
   iv) acquiring data characterizing a number of usage sequences that can be performed by a driver, including data on a longevity of the motor vehicle;
   v) acquiring data characterizing a value representing a range of the vehicle;
   vi) determining data characterizing an estimate of the number of usage sequences performed and a probable longevity as a function of the data on the longevity;
   vii) determining data characterizing a particular vehicle usage sequence as a function of the data characterizing the probability of performing the vehicle usage sequence and the probable longevity;
   viii) determining data characterizing a duration for each of the segments of the particular vehicle usage sequence;
   ix) determining data characterizing a stabilized temperature value for each of the segments of the particular vehicle usage sequence;
   x) determining data characterizing a one-time value of the temperature of the component during a current segment of the particular vehicle usage sequence as a function of:
      (1) data characterizing the stabilized temperature during the segment of the particular vehicle usage sequence that precedes the current segment of the particular vehicle usage sequence,
      (2) data characterizing a difference between (i) the stabilized temperature value during the current segment of the particular usage sequence of the vehicle and (ii) the stabilized temperature value during a segment of the particular vehicle usage sequence that precedes the current segment of the particular vehicle usage sequence, and
      (3) data characterizing the ratio between (i) the duration elapsed since the start of the current segment of the particular vehicle usage sequence and (ii) a thermal inertia value for the current segment determined from the data characterizing the thermal inertia value with regard to at least one of the segments; and
   xi) determining the data characterizing at least one change in temperature of the component of the motor vehicle using the data characterizing the one-time value of the temperature of the component during the current segment of the particular vehicle usage sequence.

2. The method according to claim 1, wherein step vi) comprises performing a random selection from the data characterizing the number of usage sequences acquired in step iv).

3. The method according to claim 1, wherein step viii) comprises performing a random selection from the data characterizing the duration of the at least one of the segments of the vehicle usage sequence acquired in step ii).

4. The method according to claim 1, wherein step ix) comprises performing a random selection from the data characterizing the stabilized temperature of the at least one of the segments of the vehicle usage sequence acquired in step ii).

5. The method according to claim 1, wherein the method further comprises determining data characterizing the one-time value of the temperature of the component with regard to a value indicative of a proportion, a duration and/or a usage mode of the vehicle.

6. The method according to claim 1, wherein the method further comprises the steps of:
   using the data characterizing the temperature change of the component of the motor vehicle to determine, by Fourier transform, data characterizing frequencies and amplitudes corresponding to multiple usage sequences; and
   determining data characterizing a number of equivalent laboratory cycles according to the data characterizing the frequencies and the amplitudes corresponding to the multiple usage sequences.

7. The method according to claim 1, wherein the data characterizing the probability of performing the vehicle usage sequence are generated so as to form a Markov chain.

8. A system for determining data characterizing at least one change in temperature of a component of a motor vehicle during a time interval, wherein the system comprises at least one information processing unit comprising at least one processor having a data storage medium configured to implement a method according to claim 1.

9. A computer program comprising program code instructions for executing the steps of a method according to claim 1 when said program is executed on a computer.

10. A medium usable in a computer, wherein a program according to claim 9 is recorded therein.

* * * * *